though adapted to receive an Allen wrench 42 which projects through the angle stop body into bore 40, serving as a back-up during making up of the connection and bringing the stop to the desired position. The member 24, at the extremity opposed to shoulder 26, has a cylindrical projection 44 which, at its end, forms a valve seat 46. Valve stem 48 carrying washer 50 screws onto angle stop body 36 through the opening 52 through which Allen wrench 42 formerly was inserted. The valve stem is threaded at 54 to move same upon turning of handle 56 in the angle stop in the conventional manner which is similarly internally threaded. When washer 50 engages valve seat 46, flow is shut off, and when the valve element or washer 50 is moved from valve seat 46, flow is permitted through the angle stop and out discharge 58, which may be threaded to receive further piping.

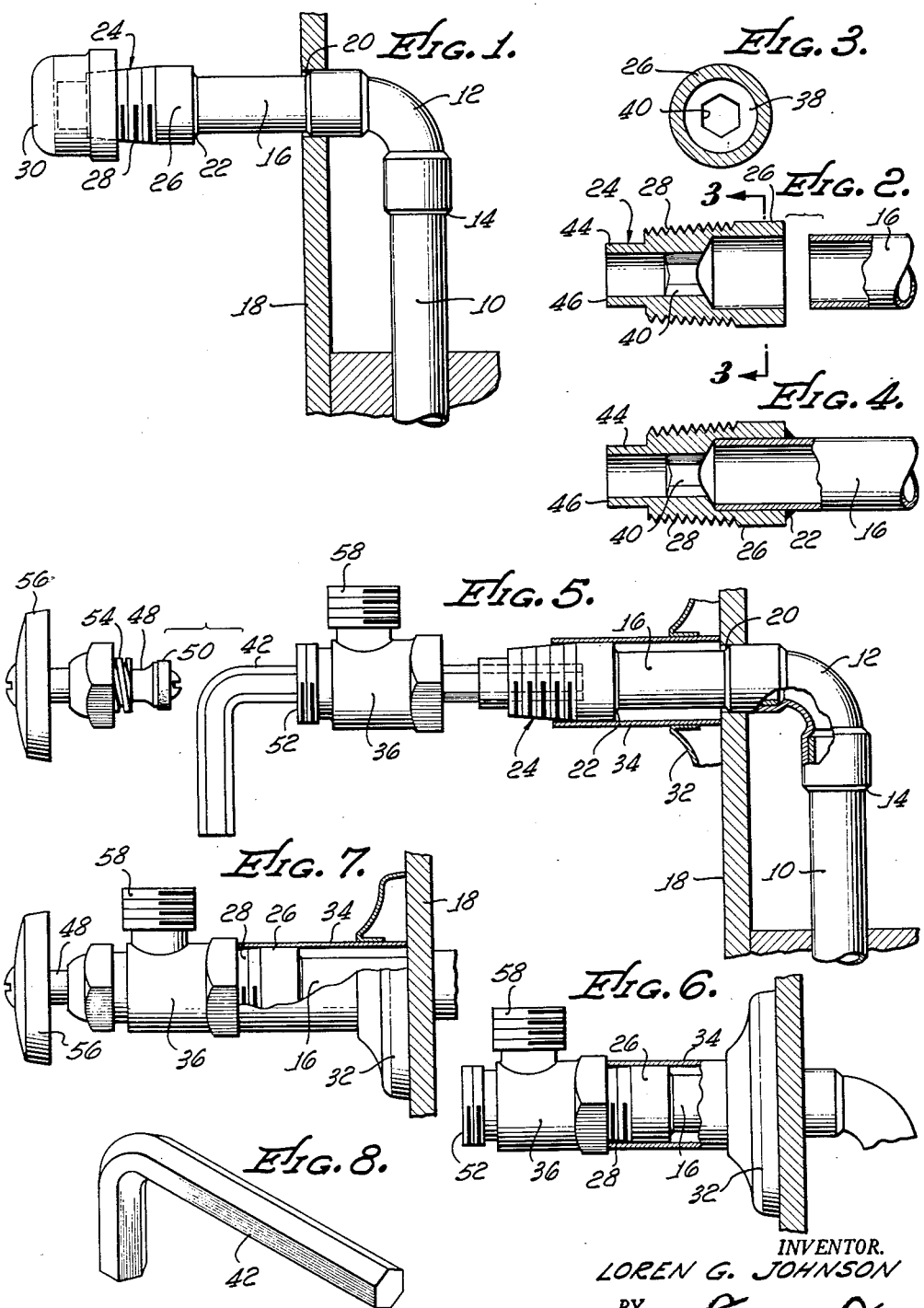

3,035,602
ANGLE STOP
Loren G. Johnson, 1885 Thompson Blvd., Ventura, Calif.
Filed Apr. 1, 1957, Ser. No. 649,909
3 Claims. (Cl. 137—315)

This invention relates to an improved angle stop.

It is an object of this invention to provide a complete visual inspection of all concealed joints when a job is roughed in and capped off for test prior to finishing.

It is a further object of this invention to provide a new angle stop which may be installed with substantial saving in labor and material costs over present methods.

It is still a further object of this invention to provide an angle stop which may be installed without use of threaded fittings and without any strain on the joints.

Other objects and advantages will be readily apparent from the following description:

In the drawings:

FIGURE 1 is an elevation of an installation roughed in;

FIGURE 2 is a sectional view of the angle stop member and a portion of the copper water tube;

FIGURE 3 is a view taken along the line 3—3 of FIGURE 2;

FIGURE 4 is a view similar to FIGURE 2 showing formation of the joint between the copper water tube and angle stop member;

FIGURE 5 is a diagrammatic view of the mounting of the angle stop body;

FIGURE 6 is a side elevation with parts thereof broken away, illustrating mounting of the angle stop body;

FIGURE 7 is a view similar to FIGURE 6 with the valve stem inserted in the angle stop body; and FIGURE 8 is a perspective view of the wrench.

In this embodiment, a copper water tube 10, which is to be concealed in a wall, has a sweat fitting 12 fitted thereon by soldering a joint at 14. A copper water tube 16 projects beyond the unfinished wall 18 having a soldered joint 20 with the sweat fitting and a second joint 22 with the angle stop member 24. The position of the angle stop from the wall is adjusted by cutting tube 16 the desired length. Stop member 24 has a shoulder 26 sufficiently long to receive a pipe wrench at the extremity adjacent tube 16. In advance of shoulder 26, are tapered male threads 28 which receive a standard pipe cap 30. Member 24 is held by a pipe wrench during tightening of cap 30 to avoid strain on joints 14, 20 and 22. The joints are then tested under pressure and the wall plastered and finished.

With the water turned off, cap 30 is removed and the angle stop is completed. Where desired a standard chrome-plated flange 32 and cover casing 34 may be placed in position.

The angle stop body 36 is then screwed onto member 24. The tapered threads 28 make possible the positioning of outlet 58 in any desired position. The member 24 has a web 38 therein with a hexagonal bore 40 therethrough adapted to receive an Allen wrench 42 which While what hereinbefore has been described is the preferred embodiment of this invention, it is readily apparent that alterations and modifications can be resorted to without departing from the scope of this invention, and such alterations and modifications are intended to be included within the scope of the appended claims.

What is claimed is:

1. An angle stop arrangement comprising: an angle body having a bore therethrough with internal threads at at least one end thereof; a stop member having external threads at one end thereof engaged with said internal threads of said body; a bore through said stop member axially aligned with the bore through said body, said bore, at the other end of said stop member being substantially cylindrical and smooth and having the unthreaded end of a conduit adhered therein; a portion of said bore through said stop member being of non-circular shape whereby a complementary tool may be engaged therein, through said bore in said body, to restrain said stop member against rotation relative to said conduit in the smooth portion of its bore at said other end while said body is being threaded onto or off from said stop member.

2. An angle stop as defined in claim 1 wherein said one end of said stop member defines a valve seat; and a valve member removably mounted in said bore in said body and movable therein toward and from said valve seat.

3. An angle stop as defined in claim 1 wherein said stop member is provided with a smooth external surface, at said other end thereof exterior to said body and engageable by a pipe wrench.

References Cited in the file of this patent
UNITED STATES PATENTS

| | | |
|---|---|---|
| 691,569 | Pohlman | Jan. 21, 1902 |
| 974,515 | Patton | Nov. 1, 1910 |
| 1,171,369 | Topping | Feb. 8, 1916 |
| 1,349,594 | Wafer et al. | Aug. 17, 1920 |
| 1,572,469 | De Lin | Feb. 9, 1926 |
| 2,702,201 | Romanelli | Feb. 15, 1955 |
| 2,866,473 | Schutter | Dec. 30, 1958 |
| 2,920,861 | Hartmann | Jan. 12, 1960 |